(12) United States Patent
Mäkelä

(10) Patent No.: US 8,745,515 B2
(45) Date of Patent: Jun. 3, 2014

(54) PRESENTATION OF LARGE PAGES ON SMALL DISPLAYS

(75) Inventor: Mikko Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 1704 days.

(21) Appl. No.: 10/820,442

(22) Filed: Apr. 7, 2004

(65) Prior Publication Data

US 2005/0229111 A1 Oct. 13, 2005

(51) Int. Cl.
*G06F 3/048* (2013.01)

(52) U.S. Cl.
USPC .............. 715/767; 715/792; 715/864

(58) Field of Classification Search
USPC .......................... 715/792, 864, 767
See application file for complete search history.

(56) References Cited

U.S. PATENT DOCUMENTS

| | | | |
|---|---|---|---|
| 5,448,696 A | 9/1995 | Shimada et al. | |
| 5,537,520 A | 7/1996 | Doi et al. | |
| 5,786,907 A | 7/1998 | Lotspiech | |
| 5,920,315 A * | 7/1999 | Santos-Gomez | 715/792 |
| 6,172,685 B1 * | 1/2001 | Pandit | 345/471 |
| 6,222,583 B1 | 4/2001 | Matsumura et al. | |
| 6,268,935 B1 | 7/2001 | Kingetsu et al. | |
| 6,289,361 B1 | 9/2001 | Uchida | |
| 6,300,947 B1 | 10/2001 | Kanevsky | |
| 6,304,855 B1 | 10/2001 | Burke | |
| 6,593,944 B1 | 7/2003 | Nicolas et al. | |
| 6,744,380 B2 | 6/2004 | Imanishi et al. | |
| 6,775,742 B2 | 8/2004 | Huffman | |
| 6,795,795 B2 | 9/2004 | Kreichauf | |
| 6,834,306 B1 * | 12/2004 | Tsimelzon | 709/228 |
| 6,857,102 B1 | 2/2005 | Bickmore et al. | |
| 6,990,228 B1 | 1/2006 | Wiles et al. | |
| 7,240,294 B2 | 7/2007 | Fitzsimons et al. | |

(Continued)

FOREIGN PATENT DOCUMENTS

| | | |
|---|---|---|
| CA | 2 514 655 | 5/2003 |
| EP | 0 949 571 | 10/1999 |

(Continued)

OTHER PUBLICATIONS

Chen, Y., Ma, W. J., and Zhang, H. J. "Detecting Web Page Structure for Adaptive Viewing on Small Form Factor Devices," Proceedings of the 12th international conference on World Wide Web (WWW 2003), May 20-24, 2003, Budapest, Hungary.*

(Continued)

*Primary Examiner* — Omar Abdul-Ali
*Assistant Examiner* — Andrew Tank
(74) *Attorney, Agent, or Firm* — Alston & Bird LLP

(57) ABSTRACT

This invention relates to method for presenting at least a part of a page, comprising at least partially dividing at least one page into a plurality of areas, presenting said plurality of areas in a first representation, making at least one area of said plurality of areas an active area, and in response to a user operation on said at least one active area, presenting at least one of said at least one active areas in a second representation. Said at least one page may be a Hypertext Markup Language HTML page, or a page of a text document, and said display may be integrated in a portable electronic device. The invention further relates to a device, a system, a computer program and a computer program product.

20 Claims, 10 Drawing Sheets

(56) References Cited

U.S. PATENT DOCUMENTS

| | | | |
|---|---|---|---|
| 7,324,113 | B1 | 1/2008 | Rouet et al. |
| 7,346,856 | B2 | 3/2008 | Nguyen et al. |
| 7,667,581 | B2 | 2/2010 | Fujimoto |
| 8,135,240 | B2 | 3/2012 | Satoh |
| 8,302,029 | B2 | 10/2012 | Mäkelä |
| 2002/0021308 | A1 | 2/2002 | White et al. |
| 2002/0030699 | A1 | 3/2002 | Van Ee |
| 2002/0032745 | A1 | 3/2002 | Honda |
| 2002/0158908 | A1 | 10/2002 | Vaajala et al. |
| 2002/0186262 | A1 | 12/2002 | Itavaara et al. |
| 2002/0191031 | A1 | 12/2002 | Ricard |
| 2004/0103371 | A1 | 5/2004 | Chen et al. |
| 2005/0041858 | A1 | 2/2005 | Celi et al. |
| 2006/0136839 | A1 | 6/2006 | Makela |
| 2006/0288280 | A1 | 12/2006 | Makela |
| 2007/0110037 | A1 | 5/2007 | Shin |
| 2007/0124669 | A1 | 5/2007 | Makela |
| 2009/0060393 | A1 | 3/2009 | Satoh |
| 2010/0225740 | A1 | 9/2010 | Jung et al. |

FOREIGN PATENT DOCUMENTS

| | | |
|---|---|---|
| EP | 1 253 510 | 10/2002 |
| WO | WO-01/11503 A2 | 2/2001 |
| WO | WO 01/65377 | 9/2001 |
| WO | WO-02/21331 A1 | 3/2002 |
| WO | WO 02/089010 | 11/2002 |
| WO | 2004023450 | 3/2004 |

OTHER PUBLICATIONS

"West: a Web Browser for Small Terminals" by Bjork et al; UIST. Proceedings of the Annual ACM Symposium on User Interface Software and Technology, vol. 1, No. 1, 1999, pp. 187-196.
English language translation of Japanese Office Action dated Jun. 24, 2008, 3 pages.
Patent Abstracts of Japan, No. 2000-076473 published Mar. 14, 2000, 1 page.
Patent Abstracts of Japan, No. 2002-007269 published Jan. 11, 2002, 1 page.
Patent Abstracts of Japan, No. 2002-175135 published Jun. 21, 2002, 1 page.
Patent Abstracts of Japan, No. 10-222143 published Aug. 21, 1998, 1 page.
Patent Abstracts of Japan, No. 2003-141022 published May 16, 2003, 1 page.
International Preliminary Report on Patentability for Application No. PCT/IB2004/003073 dated Dec. 29, 2005.
International Search Report and Written Opinion for Application No. PCT/IB2004/003073, dated May 4, 2005.
Canadian Office Action for Application No. 2,537,100, dated May 4, 2011.
Canadian Office Action for Application No. 2,537,100, dated Jul. 15, 2011.
Chinese Office Action for Application No. 200480027068.3 dated May 18, 2007.
Japanese Office Action for Application No. 2006/527506 dated Jun. 24, 2008.
Japanese Office Action for Application No. 2006/527506 dated Oct. 27, 2009.
Korean Office Action for Application No. 10-2008-7023006 dated Dec. 19, 2008.
Korean Office Action for Application No. 10-2008-7023006 dated Mar. 10, 2011.
Korean Office Action for Application No. 10-2008-7023006 dated Jul. 27, 2009.
Korean Office Action for Application No. 10-2008-7023006 dated Jul. 2, 2011.
European Communication for Application No. 04 769 438.5 dated Mar. 17, 2010.
European Communication for Application No. 04 769 438.5 dated Apr. 8, 2009.
European Communication for Application No. 04 769 438.5 dated Jul. 30, 2007.
Hanke, J. C.; "*Websites professional selbst gestalten*;" Franzis Verlag GmbH; pp. 94-114; dated 2003.
Lenger, M.; "*Architektur and Arbeitsweise eines Web-Browsers*;" dated Jan. 14, 2001.
Yin, et al.; "*Optimization of web page for mobile devices*;" pp. 1-9; dated 2004.
Communication Pursuant to Article 96(2) EPC for European Application No. 04 769 438.5; dated Nov. 29, 2006.
Machine Translation of JP Publication No. 2002-007269; published Jan. 11, 2002 (8 pages).
Machine Translation of JP Publication No. 2002-175135 published Jun. 21, 2002 (10 pages).
Machine Translation of JP Publication No. 2003-141022; published May 16, 2002 (19 pages).
Office Action for Indian Application No. 1001/CHENP/2006; dated Feb. 4, 2008.
Office Action for Korean Application No. 2008-7023006; dated Feb. 23, 2011.
"*Rectangular Areas*;" retrieved on Dec. 19, 2013 from <http://www.math.tamu.edu/~dallen/ictcm_colo/rectangles/rectangles.htm>.
Summons to Attend Oral Proceedings Pursuant to Rule 115(1) EPC for European Application No. 04 769 438.5; dated Jun. 5, 2013.
Written Opinion for International Application No. PCT/IB2004/003073; dated Oct. 26, 2005.

\* cited by examiner

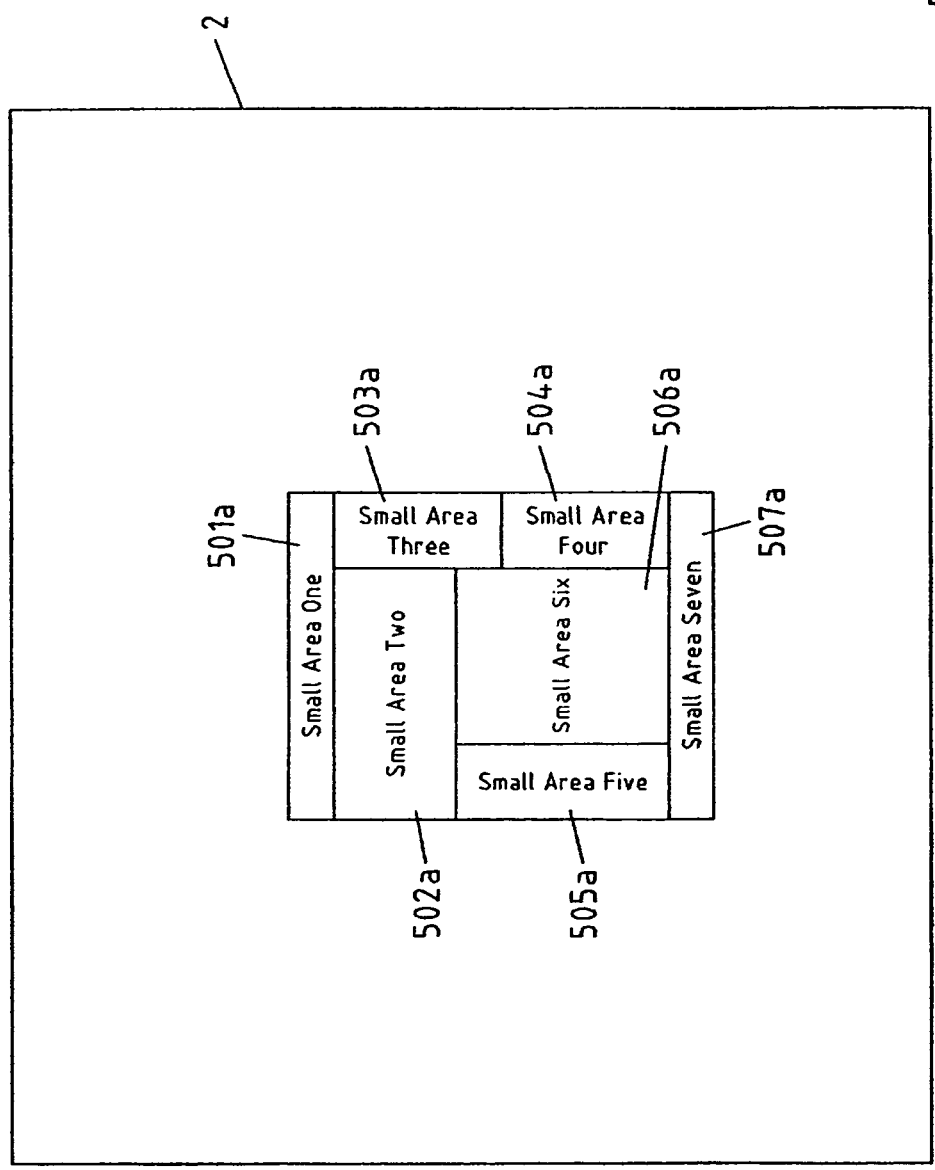

PRESENTATION OF LARGE PAGES ON SMALL DISPLAYS

FIELD OF THE INVENTION

This invention relates to a method, a computer program, a computer program product, a device and a system for presenting at least a part of a page.

BACKGROUND OF THE INVENTION

The ongoing miniaturization of multi-media devices such as Personal Digital Assistants (PDAs) or mobile phones in recent years appears to be only bounded by the perceptual limits of the human user. This particularly applies to the design of the displays of multimedia devices, with a remarkable trend to increase the relative area of the device that is consumed by its display. However, the display sizes of, for example, hand-held devices are necessarily significantly smaller than the display sizes, for which content is usually designed. If for instance content of the World Wide Web (WWW), i.e. web pages formatted according to the Hypertext Markup Language (HTML) or derivatives thereof (such as Extensible HTML (XHTML)), is to be displayed on the display of a hand-held device, it has to be considered that these web pages are normally designed for portrayal on a computer monitor, the dimensions of which are often remarkably larger than the display dimensions of a hand-held device such as a mobile phone.

Viewing web pages on a small display requires horizontal and vertical scrolling with scroll bars, which is generally experienced as uncomfortable or even annoying for the user.

Consequently, most browsers that are installed in, for example, hand-held devices and provide for the interpretation of the web page content offer the possibility to view web pages in a format that is optimized for the display dimensions of the hand-held device. This is usually achieved by rendering the web page so that it fits the width of the device's display.

This method of rendering the page so that it fits the width of the device's display causes at least the following problems:
  Rendered pages get very tall, so a lot of vertical scrolling is required.
  The structure of the web page is not preserved well by the rendering process, for example form elements like input fields frequently get separated far away from each other if they are aligned using tables.
  An original layout mode is required as an additional viewing method, as all the pages just do not convert usably into tall and narrow format.
Even when such an original layout mode is provided by the browser, there arise further problems:
  As the web page area is big, a lot of panning and zooming is needed to explore the entire content of the web page.
  On a small display, it is difficult to figure out the structure of a large page, i.e. the viewer may lose an overview of the entire web page.
  ext paragraphs in the original layout usually are wider than the display width, so that paragraphs in the original layout mode on a small display are often difficult to read.

SUMMARY OF THE INVENTION

In view of the above-mentioned problems, it is, inter alia, an object of the present invention to provide a method, a computer program, a computer program product, a device and a system for an improved presentation of large pages on small displays.

A method is proposed for presenting at least a part of a page, comprising at least partially dividing at least one page into a plurality of areas, presenting said plurality of areas in a first representation, making at least one area of said plurality of areas an active area; and in response to a user operation on said at least one active area, presenting at least one of said at least one active areas in a second representation.

Said at least one page comprises content that may be structured or organized, for instance, the page may contain pictures, tables, text paragraphs, forms or similar elements. The layout and size of said at least one page may be optimized for portrayal on a computer monitor or television screen. To allow for a presentation of at least a part of said at least one page, for instance for a displaying on a display the dimensions of which, such as display diagonal or height and width of the display, may be substantially smaller than those of a computer monitor or television screen, said at least one page is at least partially divided into a plurality of areas. For instance, if said at least one page is structured as a table, the cells of the table may represent said areas, and/or if the at least one page contains pictures, said pictures may represent said areas.

Said at least one page is at least partially divided into said plurality of areas. Thus either the complete page, or only a part thereof may be divided into areas. In case of several pages, said pages may be completely divided into areas or only parts of each page may be divided into areas. Said parts may be the same for said pages, for instance only a center region or the content of a specific frame on each page, or said parts of said pages may be different.

According to the present invention, it is also possible that several pages are at least partially divided into areas. These several pages may for instance be pages of a text document, slides of a presentation, several web pages or any other accumulation of information-carrying pages. When dividing said several pages into areas, not necessarily each area corresponds to one page. For instance, several pages may correspond to an area, or only parts of a page may correspond to an area. At least partially dividing several pages into areas that are presented in a first representation and then, upon user operation, at least partially in a second representation allows the user to comfortably gain an overview on information that is spread across several pages and thus naturally difficult to perceive.

Said plurality of areas is then presented in a first representation. This may for instance be a small representation, i.e. the size of said areas may be reduced as compared to their original size. In said first representation, said areas of said plurality of areas may, for instance, be scaled to a smaller size by reducing the height and/or width of the area, or may be cropped by cutting off parts of said area and displaying the remaining part, for instance, the content in the upper left corner of the area, or may be indicated by an icon, for instance, an icon symbolizing an image or an input field. For different areas of said plurality of areas, different size reduction techniques such as scaling, cropping, using icons or any combination of them may be used. Said first representation may also comprise total skipping of areas of a page, if said areas are decided to contain no relevant information, or if it is desired to remove advertisements or other unwanted content. In said first representation, the actual content of said areas in first representation may no longer be clearly distinguishable. However, active elements such as hyperlinks, animated images, forms or similar elements within said areas may still properly work in said first representation (or at least be recognizable).

With said plurality of areas being presented in first representation, it may be possible to reduce the original area of the at least one page down to an area that lends itself for portrayal on a small display. However, even in this first representation, horizontal and/or vertical scrolling may be required to explore areas of said plurality of areas in said first representation. Even when the content of one or more areas in said first representation may no longer be clearly visible, a viewer gets an overview on the structure and contents of the at least one page, wherein the required amount of horizontal and/or vertical scrolling may be eliminated or at least reduced. The same holds for the presentation of more than one page by dividing the pages into areas and displaying said areas in a first and a second representation, which allows the user to gain a structured overview on information that is spread across several pages.

When presenting said plurality of areas in said first representation, at least one of said areas is made an active area, i.e. it may, for instance, be made selectable, for instance by a viewer or by a browser. Said user operation on said at least one active area then would be a selection, and said at least one active area being selected then becomes a selected area. Prior to said selection, said at least one active area may be focused. Focusing may be implemented in a way that an accentuation can be navigated among said active areas, for instance, via a cursor, and by pressing a key or a button, the active area that is currently accentuated/focused, is selected. As an alternative for selection, each active area may be assigned a number, letter or symbol, and the active area then can be selected by pressing a key with the corresponding number, letter or symbol or entering a command into a user interface. Further alternatively, said selection may be accomplished via tipping on the active area with a stylus or a finger on a touch-screen display, or with a mouse pointer, if mouse functionality is provided in a device. Said selection may also be automatically accomplished by a device or application, based on pre-defined selection information, for instance an area that contains new content or an area that contains a form may be automatically selected or alternatively, said active area may be automatically highlighted, for example, by placing a focus or cursor onto it, but not automatically selected.

At least one of said at least one active areas is then presented in a second representation. If said user operation is a selection of said at least one active area, said at least one active area presented in said second representation then corresponds to said selected area. In said second representation, which may, for instance, be a large representation, said selected area may be scaled to a larger format than in said first representation, or may be less cropped, or both, so that its content may be properly inspected and used. If said selected area is indicated by an icon in said first representation, in said second representation its actual content may be presented. In said second representation, said selected area may be scaled to fit at least one dimension of a display, for instance the width of the display (scaling may also be done so that text is shown in its full size but forced to wrap to display width), or it may be scaled to its original size (possibly so that all text inside the area is forced to wrap to the display width and is, for example, left aligned). However, scrolling may still be required to entirely view the selected area in said second representation. In said second representation, said selected area may be presented alone, or together with neighboring areas, wherein active neighboring areas or both active and non-active neighboring areas may be presented. Scrolling from said selected area to said neighboring areas may be possible by interaction of the viewer or browser. Said at least one selected area and possibly said neighboring areas in said second representation and areas in said first representation may well be presented at the same time. For instance, when said plurality of areas in said first representation is presented, the selection of an active area may cause an enlargement of the selected area, wherein said selected area then is displayed in said second representation, together with the plurality of areas in said first representation, but possibly without the first representation of the selected area, which now is presented in said second representation. To preserve the layout of the at least one page when mixing first and second representations, it may be advantageous that areas that are at least partially at the same height or width as the selected area, for instance, in the same row or column in a table layout, are also displayed in second representation, wherein their up-scaling then depends on the size or scaling of the selected area in said second representation. For these areas on the same height/width, enlarging may also be done in one dimension, for example increasing width of areas above/below the selected area. By de-selecting said selected area, said plurality of areas is then presented in said first representation again, and a different active area may be selected for closer inspection. When one active area is selected, the user may scroll a display on which said active area is presented, so that one or more of the neighboring areas become visible, wherein these neighboring areas may be in first or second representation. The user may then directly select any of the neighboring areas, and after selection, the new selected area is shown in second representation and other areas (including the area that was previously shown in second representation) are shown in first representation.

Alternatively, it is possible that when selecting a neighboring area, both the neighboring area and a previously selected area are shown in second representation. In this way the user can choose more than one area to be shown in second representation at a time. The user can also de-select areas one by one to return them to be shown in first representation.

The present invention obviously allows for an improved presentation of large pages on small displays by breaking down the at least one page into a plurality of areas, which are presented in a clear first representation that may grant the viewer an overview on the structure of the at least one page, and, via the possibility to select active areas in said first representation via user operation and then to view said selected areas in a second representation, also may allow to present relevant areas of the at least one page in adequate size. In contrast to state-of-the-art techniques, it may be possible to skip the necessity of a complex original layout mode. The amount of scrolling, panning and zooming required to get an overview on the at least one page and to explore its content can be significantly reduced, so that less user interaction is needed and one-hand usage is facilitated.

According to a method of the present invention, in said user operation, at least one of said at least one active areas is selected, and wherein at least said selected area is presented in said second representation.

According to a method of the present invention, at least two areas of said plurality of areas are made active areas. Then the viewer may select at least one of said two active areas to be presented in said second representation.

According to a method of the present invention, said at least partial division of said at least one page into said plurality of areas is based on a structure of at least a part of said at least one page. Said structure may be based on the appearance of at least a part of said at least one page, for instance, if the at least one page is a picture, which contains several elements, said elements may be assigned to respective areas. In case of several pages, said structure may at least partially be based on the sequence of logical linking of said pages, so that, for instance, said several pages are divided into areas in a way that each area contains some consecutive pages or similar.

Said structure may also be based on the format that defines the page. For instance, if the page is a web page that obeys the Hypertext Markup Language (HTML) or a similar language format, the page is inherently structured in terms of HTML elements such as for instance frames, tables, paragraphs, images and hyperlinks. HTML tags marking the beginning and the end of HTML elements may then be exploited when dividing the page into said plurality of elements. Said division may for instance be performed by a browser or any other application that is installed in the device or by a content optimization server in the network, i.e. a server that is located between the client and the server that provides pages. Data traffic goes through the content optimization server that may be capable of modifying pages to be better suitable for a mobile client.

According to a method of the present invention, said at least partial division of said at least one page into said plurality of areas is based on a sectioning algorithm. Said sectioning algorithm may be based on pre-defined rules and perform a partial or complete division of said at least one page into a plurality of areas according to these rules.

According to a method of the present invention, in said first representation, at least one area of said plurality of areas is scaled to a size that is smaller than the original size of said respective area. Said scaling may refer to the diagonal, height or width of said area. Said scaling may also comprise image processing techniques, for instance to improve the appearance of the area in said first representation after the scaling, or be combined with cropping techniques. Each area of said plurality of areas may be subject to the same scaling, or different scaling methods and amount of scaling may be applied.

According to a method of the present invention, in said first representation, at least one area of said plurality of areas is cropped. Cropping comprises cutting of certain portions of said area, for instance, the upper left portion or a center portion or a particularly important portion of an area may be presented, wherein said important portion may be automatically determined. Said cropping may be combined with scaling and/or image processing.

According to a method of the present invention, in said first representation, at least one area of said plurality of areas is indicated by an icon. For instance, an area that contains an image may be indicated by an image icon. The size of said icon may be smaller than the original size of said area. It is also possible that when the user focuses an area that is shown in said first representation (scaled or/and cropped), a small icon may be shown in the corner of that area, to indicate to the user that upon selection the area will be enlarged. If the user removes focus from that area, then the icon is taken away too. The icon can be drawn to be transparent, too, so as not to hide content behind it that much.

According to a method of the present invention, areas of said plurality of areas with a size that is above a size threshold and/or that contain an amount of information that is above an information threshold are made active areas. Said size threshold may for instance refer to the size of an area, and said information threshold may quantitatively refer to an amount of characters in a text area. Said information threshold may also qualitatively prescribe that if an area, for example, only contains an input field or a similar element without further text, the amount of information that this area represents is below said information threshold.

According to a method of the present invention, at least one of said at least one active areas is automatically focused and/or selected according to a selection criterion. Said active area may for instance be determined by an instance in the device, based on said selection criterion, which may for instance prescribe that the first active area of a page has to be focused and/or selected or that the first active area with an input field or image or text has to be focused and/or selected or that the first area containing new information has to be focused and/or selected. The area containing new information may, for instance, be determined by comparing information of the current page and a previous page. Also the size of the active area may be used as a selection criterion.

According to a method of the present invention, in said second representation, said at least one active area is scaled to a size that is larger than its size in said first representation. In said first representation, the selected area is scaled, cropped or indicated by an icon, or modified according to any combination of these techniques, wherein the size of said first representation of said selected area may be smaller than the original size of said selected area in order to allow a compact presentation of the page (or parts thereof) on said display. In contrast, in said second representation, said selected area is scaled or enlarged to a size that is larger than said size of said selected area in said first representation, so that an improved portrayal of the contents of said selected area is possible. In said second representation contents of an area may be additionally zoomed in and out. This may be done so that zooming affects size of contents of an area shown in second representation. Alternatively, the zooming may be applied to all areas (in first and second representation). In addition to this, there might be a separate zoom for areas that are shown in said first representation.

According to a method of the present invention, within at least one of said areas presented in said first representation, elements can be directly selected by a user. Said elements may for instance be hyperlinks, buttons or similar elements. In that case, the user may separately select said at least one area containing said elements to be presented in said second representation.

It is further proposed a computer program with instructions operable to cause a processor to perform the above-mentioned method steps. Said computer program may for instance be implemented in a device, or may be operated or contained in a browser that is used by said device. The program may also be on the server where the web pages are stored or on a content optimization server.

It is further proposed a computer program product comprising a computer program with instructions operable to cause a processor to perform the above-mentioned method steps. Said computer program product may for instance be any type of storage medium that is suited for cooperation with an electronic device that houses said display, for instance a flash card, a SIM card, a RAM, a ROM, a memory stick, a CD, a DVD, or a diskette. From said computer program product, said computer program may be loaded into an internal memory of a digital processor of said device and then be processed.

It is further proposed a device for presenting at least a part of a page, comprising means for at least partially dividing at least one page into a plurality of areas, means for presenting said plurality of areas in a first representation, means for making at least one area of said plurality of areas an active area; and means for presenting at least one of said at least one active areas in a second representation. Said device may for instance be a hand-held electronic device, as for instance a PDA or a mobile phone, or be a part of such a device.

According to a device of the present invention, said areas are presented on a display module, or on a display of a portable electronic device.

It is further proposed a system for presenting at least a part of a page, comprising means for at least partially dividing at least one page into a plurality of areas, means for presenting said plurality of areas in a first representation, means for making at least one area of said plurality of areas an active area, and means for presenting at least one of said at least one active areas in a second representation.

Said system may comprise several logically or physically separated instances that may jointly or separately implement said means for dividing said at least one page into said plurality of areas, said means for presenting said plurality of areas in a first representation, said means for making at least one area of said plurality of areas an active area, and said means for presenting at least one of said at least one active areas in a second representation. For instance, said system may comprise a content optimization server that divides pages received from a server into a plurality of areas, and a client, on which said areas in first and second representation then are presented.

These and other aspects of the invention will be apparent from and elucidated with reference to the embodiments described hereinafter.

BRIEF DESCRIPTION OF THE DRAWINGS

FIG. 5a: a further example of an HTML page being displayed in small representation according to the present invention;

DETAILED DESCRIPTION OF THE INVENTION

Figures 1, 2A, 2B:
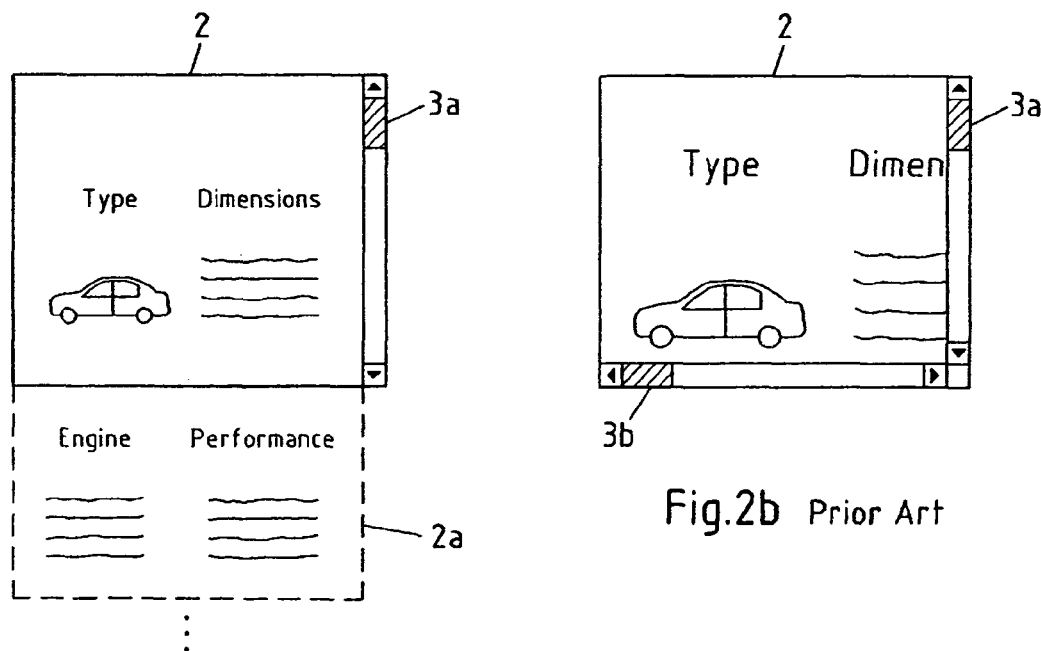
FIG. 1: an exemplary Hypertext Markup Language HTML page according to the prior art.
FIG. 2a: the HTML page of FIG. 1 being rendered to fit the width of a display according to the prior art.
FIG. 2b: the HTML page of FIG. 1 being displayed in original layout mode according to the prior art.

FIG. 1 depicts an exemplary Hypertext Markup Language HTML page 1 that basically comprises a table with four rows and four columns. The content of this HTML page 1 is related to information on cars, and each of the last three rows of the table contains a picture, dimension parameters, engine parameters and performance parameters of one specific type of car. Note that the textual information in the table cells is only depicted symbolically.

FIG. 2a depicts the HTML page of FIG. 1 being rendered to fit the width of a display 2 according to the prior art. With the HTML page 1 being too large to fit on the display 2 of a portable device, for instance, a mobile phone, the page has to be rendered, and it is the result of the rendering that only the left upper quarter of the HTML page, in slightly reduced scale, is visible on the display 2. To avoid at least horizontal scrolling, the right upper quarter of the HTML page 1 is now positioned below the left upper quarter that is visible in the display 2, and can be inspected by means of vertical scrolling with a vertical scroll bar 3a. This is schematically depicted in FIG. 2a by the dashed box 2a being positioned below the display 2. Further vertical scrolling then would move the left lower quarter of the HTML page 1 into the display 2, and finally the right lower quarter of the HTML page 1 would be moved into the display 2.

The prior art rendering technique obviously destroys the layout of the table contained in the HTML page 1. Whereas a viewer can easily assign the dimension parameters displayed in the display window 2 of FIG. 2a to the car in the first row of the table, because the required row and column labels of the table are still available in the portion of the HTML page 1 that is visible within the display 2, such a clear assignment is no longer possible for the engine and performance parameters in the right upper quarter of the HTML page 1, when the HTML page 1 is rendered and displayed on the display 2 as indicated by the dashed box 2a in FIG. 2a. This is due to the fact that the row labels, in this case the picture of the car whose parameters are listed in the respective row, are no longer depicted within the dashed box 2a of FIG. 2a. It is easily seen that, also when displaying the left and right lower quarter of the HTML page 1 on the display 2, no clear assignment of the textual information to the row and/or column labels of the table is possible. The prior art rendering technique thus breaks up the structure of the table and aggravates the comprehension of the content of the HTML page 1.

To allow a viewer to inspect the HTML page 1 as a whole, without destroying its structure as it is the case in the rendering technique of FIG. 2a, prior art devices with small displays usually offer an original layout mode. This original layout mode, which is depicted in FIG. 2b, abandons rendering and scaling of the page and thus requires both vertical 3a and horizontal 3b scrollbars, so that all portions of the HTML page 1 can be moved into the display 2, complicating and slowing down the comprehension of the HTML page 1.

Figure 3:
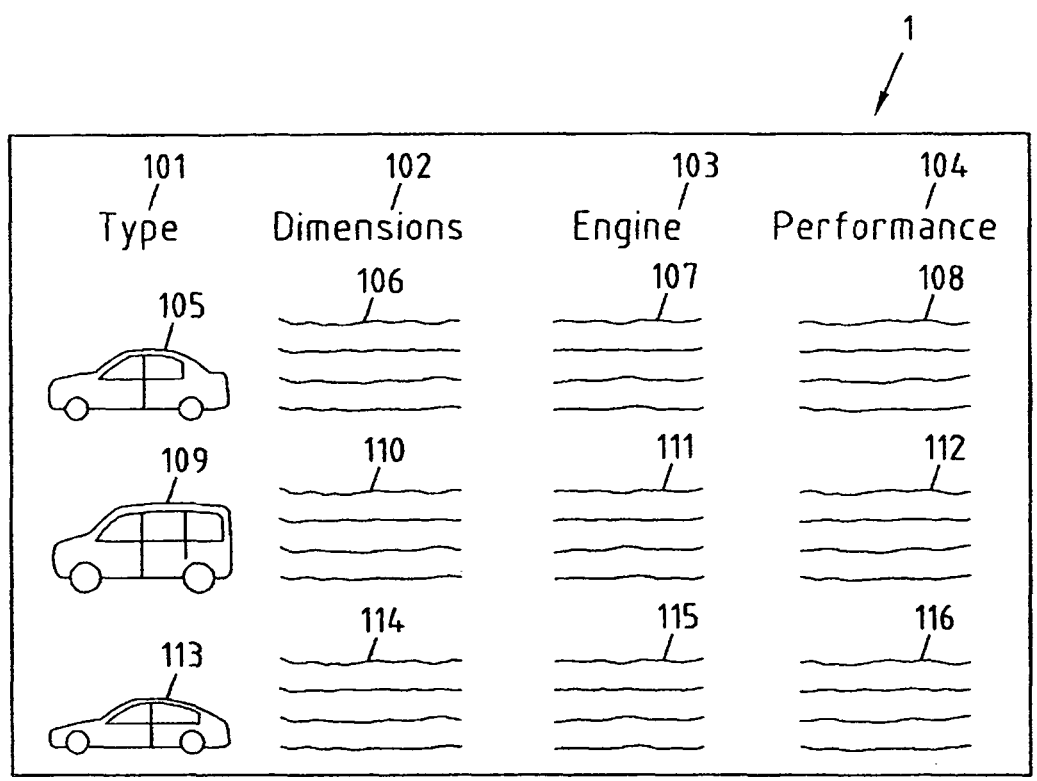
FIG. 3: a division of the HTML page of FIG. 1 according to the present invention.

FIG. 3 depicts a division of the HTML page 1 of FIG. 1 according to the present invention. The 16 table cells of the table contained in the HTML page 1 are assigned a respective area 101 . . . 116. This may for instance be performed by a browser or by a device in the device that operates the display, on which the HTML page 1 is to be depicted. The process of dividing the HTML page 1 into areas 101 . . . 116 may be based on the structure of the HTML page 1, which may be represented by HTML elements such as tables, paragraphs, frames, images or other, and which may be detected by processing the source code of the HTML page 1. For instance, the structure of the HTML page 1 may be examined by searching the HTML page 1 for specific HTML tags that define the beginning and the end of such HTML elements.

Figure 4A:
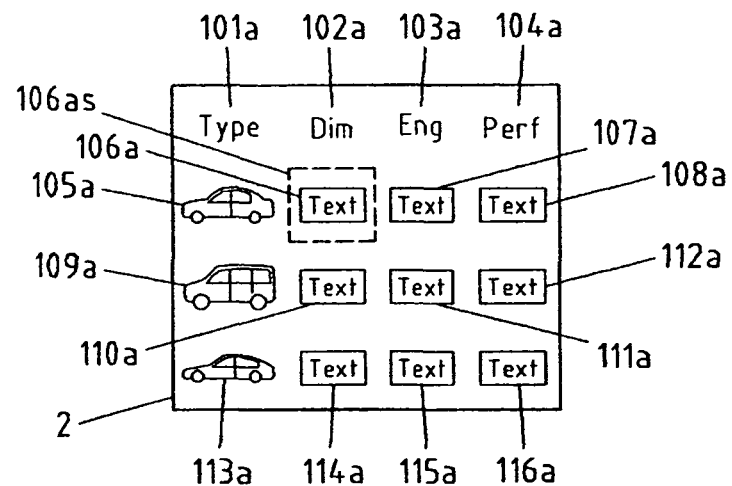
FIG. 4a: the HTML page of FIG. 3 being displayed in small representation according to the present invention.

FIG. 4a illustrates the HTML page of FIG. 3 being displayed (presented) in a first representation according to the present invention, wherein this first representation is chosen to be a small representation throughout this exemplary embodiment of the present invention. The areas 101 ... 116 as obtained by the division of the HTML page 1 are transformed into areas 101a ... 116a in small representation. For the areas 101a, 105a, 109a and 113a, this transformation is achieved by scaling the size of the areas 101, 105, 109 and 113 of the original size HTML page 1 to a smaller size. For the areas 102a, 103a and 104a, this transformation is achieved by combined scaling and cropping of the areas 102, 103 and 104. Finally, the areas 106a ... 108a, 110a ... 112a and 114a ... 116a are all assigned a text icon, which indicates that the corresponding areas 106 ... 108, 110 ... 112 and 114 ... 116 contain text that would be unreadable when being scaled to small representation format.

In FIG. 4a, all areas in small representation 101a ... 116a are active areas. Thus a browser or a device within the device that operates the display on which the HTML page 1 is to be displayed may have examined at least a part of the areas 101 ... 116 and, according to a selection criterion, for instance being related to the type and/or amount of information contained in the area, has decided if areas shall be active or not. FIG. 4a further depicts a dashed accentuation frame, which indicates that a viewer currently performs a user operation on said active area 106a, which is chosen as a selection throughout this exemplary embodiment of the present invention. In what follows, a selected area will always be identified by an "s" that is appended to its numeral, so that the selection of area 106a leads to a selected area 106as. The accentuation frame, which may be moved from one active area to the other by a viewer via a user interface, for instance a joystick, is only one of several possible ways of selecting active areas. Active areas may equally well be selected via a stylus or a finger on a touch screen display, or via the assignment of numbers or symbols to active areas and the selection of these numbers or symbols via keyboard input or voice command, or via shortcuts assigned to a certain selection operation, for instance for the selection of the area that is located left, right, above or below the currently selected or focused area or for the selection of the previously selected area.

Figure 4B:
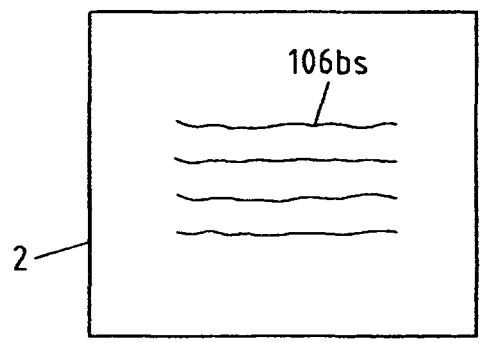
FIG. 4b: a selected area of the HTML page of FIG. 3 being displayed in large representation according to a first embodiment of the present invention.
Figure 4C:
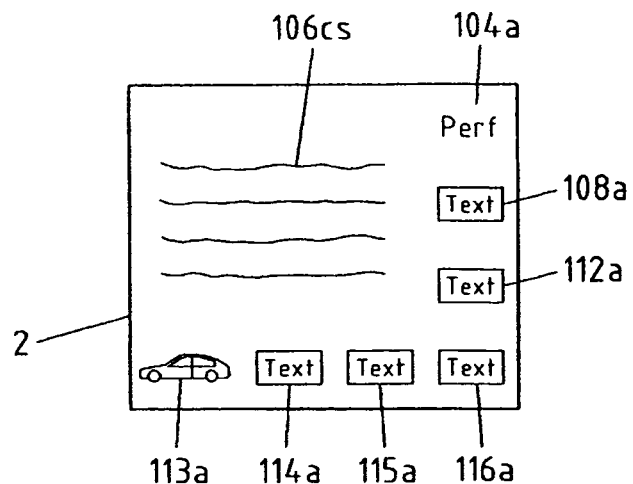
FIG. 4c: a selected area of the HTML page of FIG. 3 being displayed in large representation according to a second embodiment of the present invention.
Figure 4D:
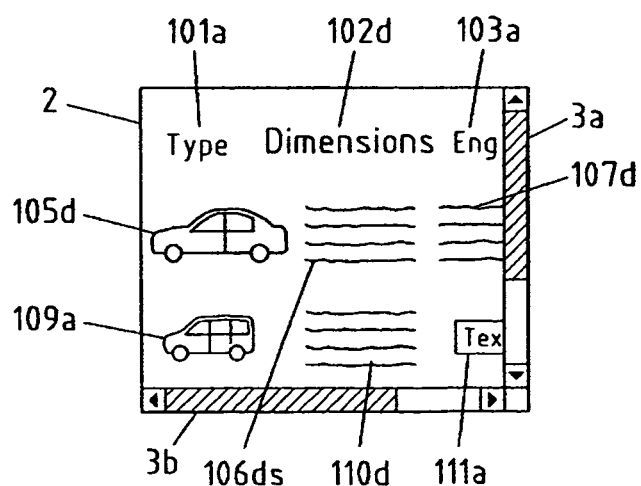
FIG. 4d: a selected area of the HTML page of FIG. 3 being displayed in large representation according to a third embodiment of the present invention.

FIGS. 4b, 4c and 4d present three specific embodiments of the present invention, wherein each embodiment proposes a different way of displaying (presenting) the selected area 106bs, 106cs or 106ds on the display 2 in a second representation, wherein this second representation is chosen as a large representation throughout this exemplary embodiment of the present invention.

According to a first embodiment, FIG. 4b depicts the displaying of the selected area 106bs in large representation, wherein large representation in this embodiment means that the selected area 106bs is scaled to fit the width of the display 2, and wherein in this embodiment, only the selected area 106bs is displayed on the display 2. Note that, whereas in the small representation 106a of area 106, a text icon was used, now a scaled version of the area 106 as in the original HTML page 1 of FIG. 3 is displayed. From the area 106bs in large representation, the viewer now can extract all the information that may not have been clearly visible from area 106a in small representation. According to this first embodiment of the present invention, the viewer thus may first get an overview on the structure of the page according to FIG. 4a, wherein all areas of the page are given in small representation, and then, after selecting an area of interest 106as, this area is displayed in enlarged fashion as area 106bs, i.e. as large as possible but not requiring the use of horizontal and/or vertical scroll bars. To return to the small scale representation as in FIG. 4a, the viewer may de-select the selected area 106bs, for instance by pressing a de-selection key.

According to a second embodiment, FIG. 4c depicts the displaying of the selected area 106cs in large representation, wherein large representation in this embodiment means that the selected area 106cs is significantly larger than the area 106a in small representation. The selected area 106cs in large representation is displayed together with other areas 104a, 108a, 112a and 113a ... 116a in small representation on the display 2. Basically, the selected area 106cs is three times the size of its corresponding area 106as in small representation and thus covers the areas 101a ... 103a, 105a ... 107a and 109a ... 111a. The content of area 106 then may not be presented as large as in the first embodiment, however, the remaining of the areas in small representation on the display when displaying the selected area 106cs in large representation always shows the viewer quite plainly the structure of the page, so when selecting areas and enlarging (large representation) or reducing them (small representation), the viewer's orientation may be supported.

According to a third embodiment, FIG. 4d depicts the displaying of the selected area 106ds in large representation, wherein large representation in this embodiment means that the selected area 106ds is significantly larger than the area 106a in small representation. The selected area 106ds in large representation is displayed together with other areas 102d, 105d, 107d, 110d in large representation and areas 101a, 103a, 109a and 111a in small representation on the display 2. The effect of supporting the orientation of the viewer when switching between large and small representation is similar to the second embodiment. However, to avoid gaps between the selected area 106ds and areas 102d, 105d, 107d, 110d, which are at least partially at the same height or width as the selected area, and to preserve the rectangular layout of the table, all these areas are displayed in large representation too, wherein the scaling of these areas 102d, 105d, 107d, 110d is related to the scaling of the selected area 106ds. In this case, due to the table layout, all areas 102, 105, 106, 107 and 110 are scaled by the same factor. The displaying of the areas 101a, 103a, 109a and 111a in small representation may avoid an overloading of the display 2 with information, furthermore, the enlargement effect is accentuated by maintaining the contrast between large and small representation on the same display.

Figure 5B:
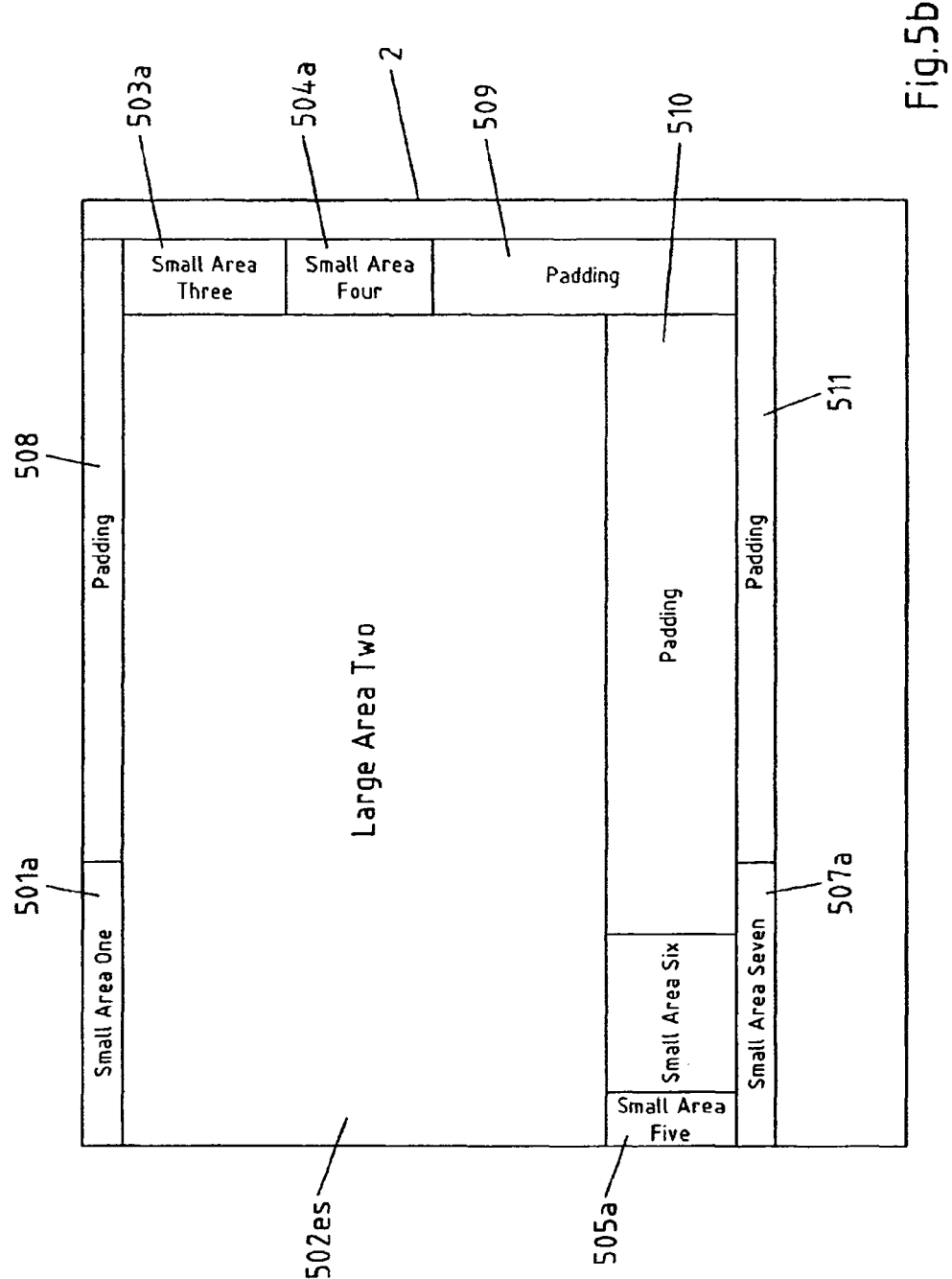
FIG. 5b: a selected area of the HTML page of FIG. 5a being displayed in large representation according to a fourth embodiment of the present invention.
Figure 5C:
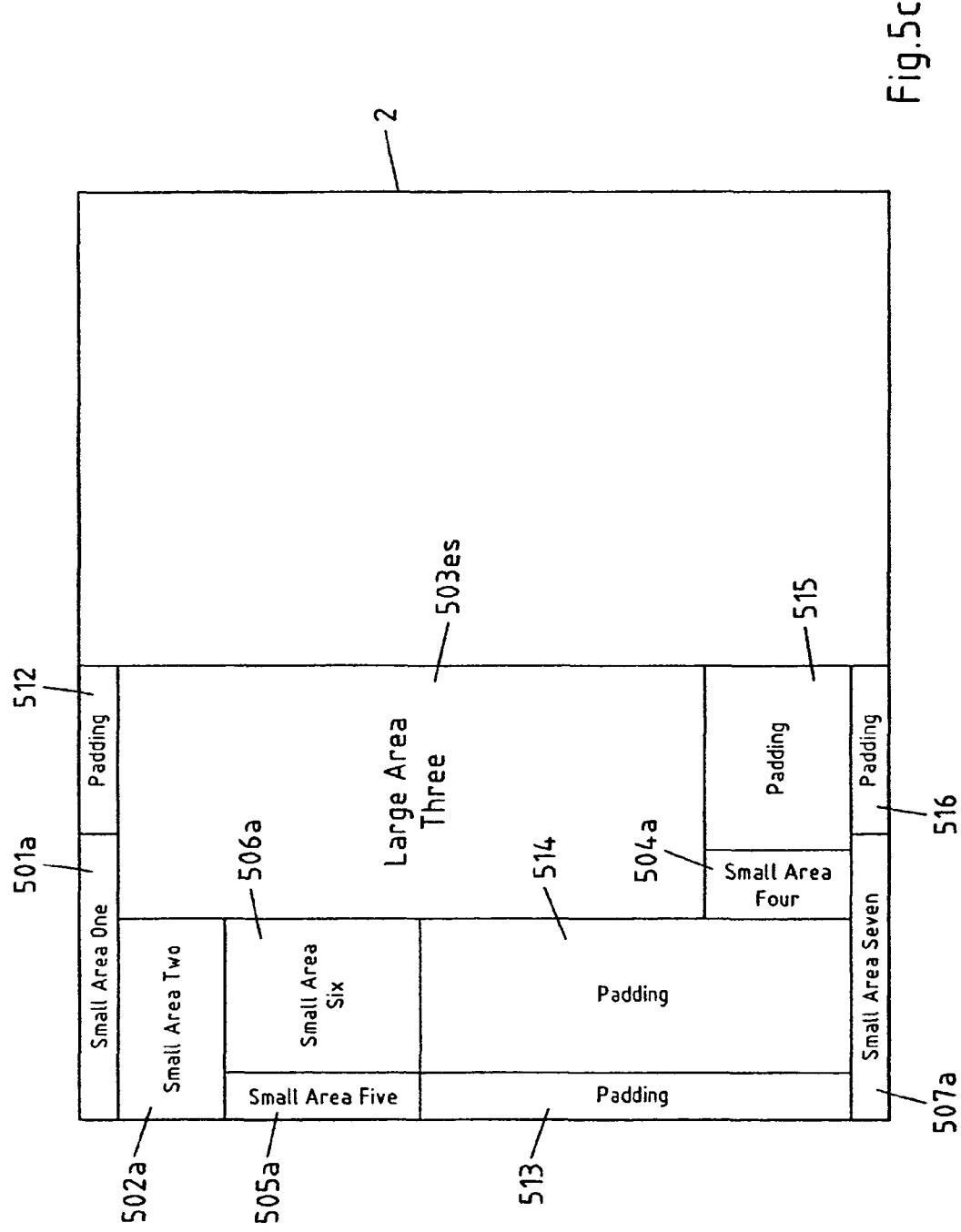
FIG. 5c: a further selected area of the HTML page of FIG. 5a being displayed in large representation according to the fourth embodiment of the present invention.

FIGS. 5a-5c visualize the presentation of selected areas of a HTML page in large representation according to a fourth embodiment of the present invention.

In FIG. 5a, an HTML page that already has been divided into a plurality of areas is displayed on a display 2 in small representation. Said areas in small representation are denoted as 501a ... 507a. Said areas in small representation may for instance be obtained from said original size HTML page via a process of dividing said HTML page and scaling the divided parts. As can be seen from FIG. 5a, the HTML page in small representation has a structure that is more complex than the simple table structure of the HTML page of FIG. 1.

FIG. 5b depicts the displaying of the HTML page of FIG. 5a when area 502a (in small representation) has been selected by a user and then is displayed in large representation as area 502es. Said selected area in large representation 502es is displayed on the same display 2 with the areas 501a, 503a ... 507a in small representation. However, padding areas 508 ... 511 have been created so that the basic arrangement of the areas of the HTML page with respect to each other is still visible. Said padding areas 508 ... 511 may, for instance, have the same background colour as an adjacent area in small representation, or may have a fixed colour, or may be transparent to that the standard background of the display is visible. The introduction of said padding areas may be interpreted as a scaling in at least one dimension of neighbouring areas of said area 502*es* that is displayed in large representation. In FIG. 5*b*, when area 502*es* is displayed in large representation, the other areas in small representation are left and top aligned, to show them as close to each other as possible. In the selected area 502*es*, which is displayed in large representation, links and other HTML elements are selectable. This may also account for said areas in small representation.

In the example of FIG. 5*b*, the canvas of areas of said HTML page in small and large representation is aligned to the left upper corner of the display 2. Of course, different alignments to other edges of the display 2 or a centering may equally well be possible. Furthermore, the areas 501*a*, 503*a* . . . 507*a* in small representation have the same size as the corresponding areas in small representation of FIG. 5*a*. Alternatively, said small representation scale might be slightly modified when at least one of said areas in displayed in large representation as depicted in FIG. 5*b*, for instance in order to better match the dimensions of the display.

FIG. 5*c* depicts a canvas of areas in small and large representation when area 503*a* of FIG. 5*a* (in small representation) has been selected by a user and then is displayed in large representation as area 503*es* together with areas 501*a*, 502*a*, 504*a* . . . 507*a*. Here, again padding areas 512-516 were introduced to preserve the basic layout of the HTML page. Note that, instead of selecting area 503*a* in a display state as depicted in FIG. 5*a* (i.e., where all areas are displayed in small representation), it is also possible that area 503*a* is selected in a display state as depicted in FIG. 5*b* (i.e., where at least one area is in large representation and the remaining areas are in small representation), in order to arrive at a display state as depicted in FIG. 5*c*. This may for instance be achieved with an accentuation or focus that can be moved between the areas (regardless whether the areas are in small or large representation or if a mix of large and small representations is presently displayed), and wherein a selection then is manifested by pressing a button or key when the desired area is currently accentuated or focused. The user may also be provided with shortcuts for enlarging certain areas, for instance the left or right area or the previous or next area.

Figure 6:
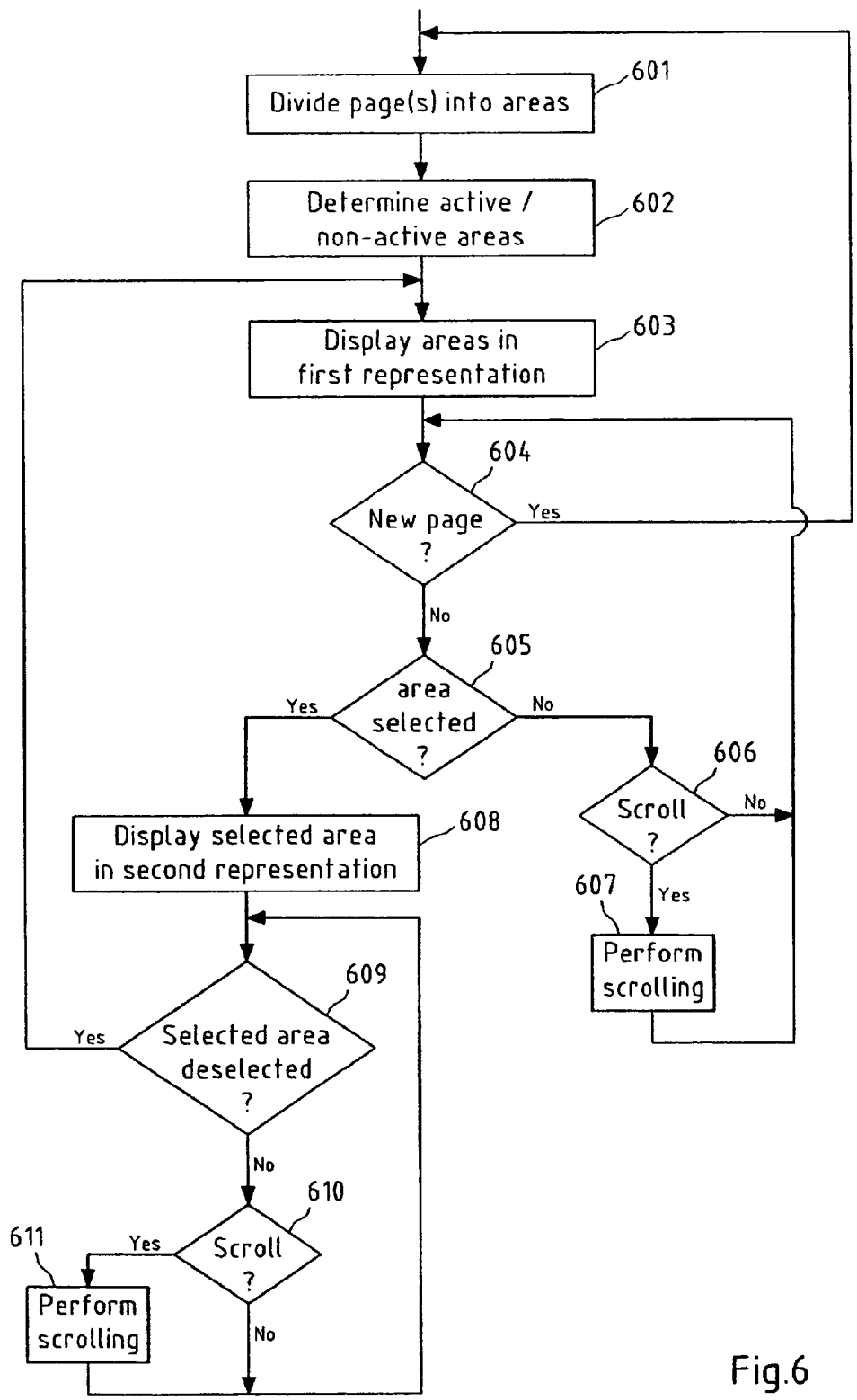
FIG. 6: an exemplary flowchart of a method according to the present invention.

FIG. 6 depicts an exemplary flowchart of a method according to the present invention. When a new HTML page is chosen by a viewer to be displayed on a display, in a first step 601, the page is suitably divided into areas. The set of areas then is examined in a step 602 in order to determine which areas shall be active areas and which areas shall be non-active areas. The set of active and non-active areas then is displayed on the display in a first representation in a step 603, which may for instance be a small representation. This step may also comprise the transformation of the areas form original size format to a first representation format, for instance via scaling, cropping or using an icon. When the page is displayed in said first representation, a viewer may choose that he wants to view a different HTML page, which is checked for in step 604. If this is the case, step 601 to 603 are repeated for the new HTML page. Otherwise, it is checked if the viewer has selected one of the areas in said first representation in a step 605. If this is the case, the selected area is displayed in a second representation in a step 608, which may for instance be a large representation. This step may also comprise the scaling of the selected area to the second representation format. It is then checked in a step 609 if the selected area is de-selected by a viewer. In this case, the method jumps back to step 603 to allow the selection of another or the same area. If the selected area is not de-selected, it is checked in a step 610 if scrolling is desired by the viewer. If this is the case, scrolling is performed in a step 611, for instance to explore areas in the neighborhood of the selected area. This scrolling may be performed seamlessly, or from area to area. If the scrolling operation in step 610 is finished or if no scrolling is desired by the viewer, the method jumps back to step 609 to allow for a de-selection of the selected area. If in step 605 no area is selected, it is checked in a step 606 if scrolling is desired by a viewer, and if this is the case, scrolling is performed in a step 607. After the scrolling operation, or if no scrolling is desired, the method jumps back to step 604 to allow the choice of a new page by the user.

Figure 7:
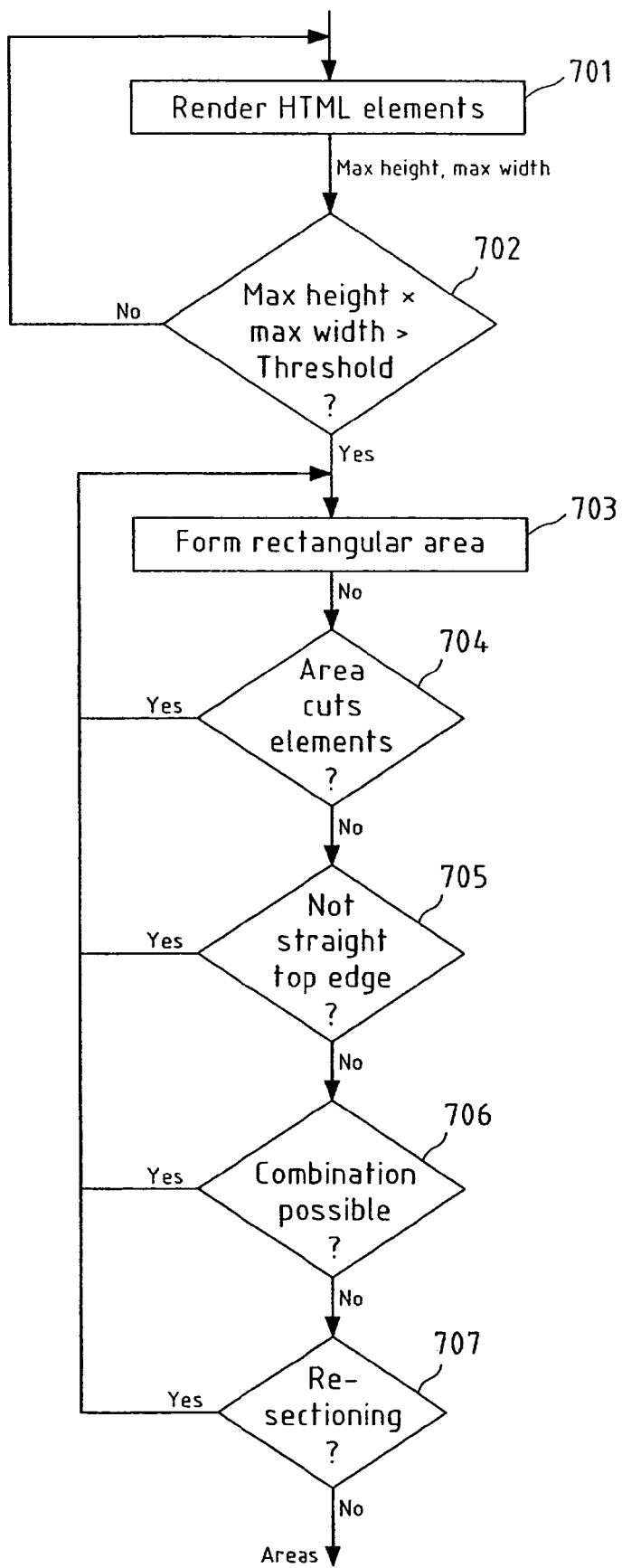
FIG. 7: an exemplary flowchart of an algorithm for dividing a page into a plurality of areas according to the present invention.

FIG. 7 depicts a simplified exemplary flowchart of an algorithm for dividing one or several HTML pages into a plurality of areas according to the present invention. This algorithm may for instance be executed in step 601 of the flowchart of FIG. 6.

In step 701 of the flowchart of FIG. 7, HTML elements of one or several HTML pages are rendered and investigated in the order they appear in the HTML source code of said page or pages. In said step 701, calculation of pixel values corresponding to said HTML objects is, for instance, performed as if an HTML page was shown in its original layout with 100% zoom factor. As a result, a maximum height and a maximum width in pixels of a number of rendered HTML objects is obtained.

In a step 702, it is then checked if the product of said maximum height and said maximum width is larger than a pre-defined threshold, for instance 100,000 pixels. If this is the case, a rectangular area containing the HTML objects rendered in step 701 is formed in a step 703. Otherwise, the step 701 of rendering HTML elements is continued until the condition of step 702 is met.

It should be noted that the calculation of step 702 only has to be performed when an area grows vertically and/or horizontally; it does not have to be performed after every selection of an area or similar changes.

In step 703 (and also in step 702), when forming an area (i.e. calculating the display area in pixels that the created area would take), table areas having no information content (no text, no images, no input fields or similar) may not be taken into account (i.e. may not be included into formed area). In other words, within tables, areas are formed according to information content in the order in which said information content appears in the HTML page source code (e.g. HTML, XHTML or similar source code).

In a step 704, it is then checked if a lower edge of said formed area would vertically cut an element that cannot be divided (for instance an <image>, or an <object>). If this is the case, forming a section according to step 703 is retried so that the last HTML element tried to be included at the last time in step 703 is not included anymore. This procedure is repeated until it leads to a lower edge of said area that does not cut any element. In addition to elements that cannot be cut, this procedure may also be applied to paragraphs (<p>, <div>) and forms (<form>).

This step may be performance-optimized by iterating first in bigger steps, and then element by element when new area edges are almost found.

According to step 703, it may be advantageous to leave a small padding between area borders and content, so that area borders and content do not touch even if an area is focused.

In a step 705, it is checked whether said formed area would not have a straight top edge. If this is the case, the algorithm returns to step 703 and tries to form a new area with a straight top edge. For example, if the first element for an area is in the middle of a left table column, and the next element would be in the top of the right table column, the end of an area should be created before the element that would make the top edge not straight.

If this is not the case, opportunities for combining sections are checked in a step 706.

For instance, if the width of an area matches that of a previous area, if these two areas are horizontally similarly positioned, and if the number of pixels of a combined area obtained when these two areas are taken together is less than a threshold, for instance 150,000 pixels, then these two areas are combined.

Furthermore, if forming areas would create empty space below areas, this empty space is combined with one or more area above it, by vertically extending an area above it by a required amount. In this special case, the empty space is not taken into account when checking a condition for re-sectioning in a step 707, as will be explained below.

If this procedure of vertically extending areas to avoid empty spaces still leaves empty space between areas, vertical borders of areas are horizontally moved, so that empty space disappears (i.e. becomes included into areas). In this special case, too, empty space is not taken into account when checking a condition for re-sectioning in a step 707.

Finally, in a step 707, it is checked if re-sectioning of said formed area is necessary, wherein in said re-sectioning, the step 703 is again performed to form a new rectangular area.

For instance, if the number of pixels of a formed area gets bigger than a threshold, for instance 300,000 pixels, after its creation (for example because of a script adding content or arrival of big images), re-sectioning is done for that area and areas after it.

Similarly, if all content of a formed area disappears after its creation (because of a script or external CSS), re-sectioning is done for that area and areas after it.

As a result of the algorithm of FIG. 7, a plurality of areas is output. These areas can be made active and be then displayed on a display in small representation, and, upon selection, can be displayed in large representation. Areas may be shown on the display only after the next area has been created. This is because sequential areas may be combined in step 706.

The exemplary flowchart for an algorithm for dividing one or several HTML pages into areas may be further refined by the following features:

- If an absolute size of an image is set in an HTML source code, placeholders of that size may be rendered instead of said image in said step 701. If a size is not set (nor has been received yet with an image file), in said step 701 said image may be assumed to be of fixed size, for instance 50 pixels high and 100 pixels wide.
- If a script writes a sequence of elements to an HTML page, that whole sequence added by a script is kept inside the same area.
- If a script moves focus to another area than the currently active one, the area to which the focus moved is zoomed, and the previously zoomed area is shrunk.
- If the number of pixels of an HTML element that cannot be divided into smaller pieces (for instance an <img> or <object>) is larger than a threshold, for instance 300,000 pixels, an own area may always be created for that element. The height of that area would be the height of the element, the left edge would be next to an area on the left (or edge of canvas if there is not an area on the left), and the right edge would be next to an area on the right (or edge of canvas if there is not an area on the right). In addition to HTML elements that cannot be divided, this rule may also be applied to big paragraphs (<p>, <div>) and big forms (<form>).
- If an HTML element is hidden (using CSS), but if it is still set to reserve corresponding space for itself (using CSS), in said step 703 of forming rectangular areas it is handled as if it was visible (i.e. it is taken into account when calculating said area).

Figure 8:
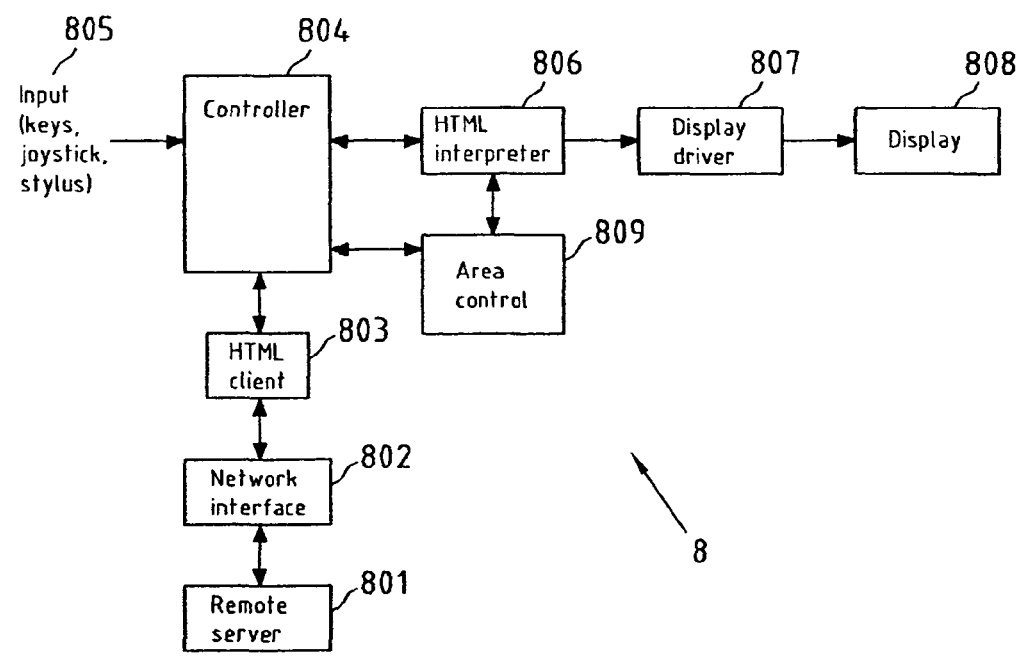
FIG. 8: an exemplary set-up of a device according to the present invention.

FIG. 8 finally depicts an exemplary set-up of a device 8 according to the present invention. The device 8, for instance a hand-held device such as a mobile phone, comprises the standard components required to implement a browser functionality: The controller 804 controls the function of the browser and receives input 805 from a viewer for example via the keyboard, touch-screen, mouse interaction, or voice commands, e.g. a new HTML page that is to be loaded. The HTML client 803 provides services to the controller 804, in particular fetching of new HTML pages via the network interface 802, which is connected to a remote web server 801. If the device 8 is a hand-held device, said connection will usually be a wireless connection. The HTML interpreter 806 is responsible for the display of HTML pages on the display 808, which is controlled by the HTML interpreter 806 via a display driver 807. The HTML interpreter 806 parses the HTML source code of the HTML page and provides the display driver 807 with the corresponding results. In the prior art, in particular rendering of HTML pages to fit the display 808 is performed by the HTML interpreter 806 and display driver 807. As an additional component, according to the present invention, an area control instance 809 is contained in the device 8, which supports the HTML interpreter 806 and the controller 804 and in particular adds functionality to at least partially divide a least one HTML page into a plurality of areas, to cause the display of the plurality of areas in a first representation, to make at least one area of said plurality of areas a active area, and to cause the display of at least one active area in a second representation. Said area control device may further comprise functionality to determine whether an area should be a active area or a non-active area. Together with the controller 804, said area control instance 809 may further check if a active area has been selected by the viewer for presentation in said second representation and if a selected area is de-selected by a viewer, in both cases via the input interface 805. Also scrolling, initiated by a viewer via the input interface 805, may be controlled by the area control instance 809 together with the controller 804.

It should be noted that there are alternative ways and variations of the present invention which will be evident to a skilled person in the art and can be implemented without deviating from the scope and spirit of the appended claims. In particular, the present invention is by no means restricted to application in hand-held devices with small displays, it may equally well be applied in all types of scenarios where content has to be presented in a clear and structured way. It is readily seen that, for the same reasons as stated above, the present invention shall by no means be limited to HTML pages. Any other format for the definition of content, such as word processing or editing formats such as for instance "*.doc", "*.rtf" or "*.pdf" or image formats such as for instance "*.jpg", "*.gif", "*.ps" or "*.pdf" or similar formats may be used.

According to the present invention, at least two pages may at least partially be divided into said plurality of areas. Said at least two pages may, for instance, be inter-linked web pages, or pages of a text document, or pages of a presentation, or similar information-carrying pages. By at least partially dividing these at least two pages into areas, it becomes possible to present said at least two pages (i.e. the corresponding areas) simultaneously in said first representation, so that the structure of said pages is more quickly and comfortably presented to a user. Multiple pages may thus be presented at the same time, wherein said areas said at least two pages are at least partially divided into may include parts of several pages, and/or a page might be an area, and/or every page may comprise multiple areas.

According to the present invention, in said second representation, said selected area may be scaled to fit at least one dimension of a display. Said selected area may for instance be scaled to the width or the height of the display, or both. When scaled to fit at least one dimension of the display, content of an area may still be bigger than the display. In this case, content can be scrolled inside the area.

According to the present invention, in said second representation, said selected area may be scaled to its original size. Presenting said selected area being scaled to its original size may require vertical and/or horizontal scrolling, because said original size may exceed the dimensions of a display.

According to the present invention, textual content of said selected area scaled to its original size may be forced to wrap to a display width.

According to the present invention, content of said selected area scaled to its original size may be forced to align to the left, to the right, or to the center. For instance, aligning to the right may be preferred if said content is normally read from right to left.

According to the present invention, only said selected area may be presented in said second representation. Areas in the neighborhood of said selected area may then be not presented, irrespective if they are in said second or in said first representation.

According to the present invention, selecting one area shown in first representation may cause all the areas to be enlarged, for example, to show a whole page in its original layout in full size. In this case information of a selected area could be used for centering a display so that as much as possible of content belonging to the selected area is shown.

According to the present invention, said selected area and at least one neighboring area of said selected area may be presented in said second representation. Said neighboring areas then do not necessarily have to be directly adjacent to said selected area, also areas with a larger distance to said selected area may be understood as neighboring areas. Presenting neighboring areas in second representation may be advantageous if the selected area in second representation does not entirely cover a display, so that gaps at the edges of said selected area can be avoided by filling them at least partially with presented content from neighboring areas.

According to the present invention, at least said selected area in said second representation and at least one of said plurality of areas in said first representation may be presented on a display at the same time. Starting from said plurality of areas being presented in said first representation, it is then possible to select one of the active areas among them in order to enlarge said selected area (second representation), wherein the other areas of said plurality of areas remain in said first representation. Only said selected area then may be in said second representation, or, said selected area and neighboring areas may be in said second representation. A user may be enabled to move focus over the edges of areas shown in said second representation to focus an area shown in said first representation. Then if the user selects that area shown in said first representation, that area is enlarged to said second representation and at the same time, one or more of the areas that were previously shown in said second representation can be returned to be shown in said first representation.

According to the present invention, areas that are at least partially at the same height or width as said selected area may be scaled at least in one dimension in accordance with the scaling of said selected area. If areas in said second and said first representation are presented at the same time, in order to preserve the layout of the page and in order to avoid coverage of areas in said first representation by selected or neighboring areas in said second representation, it may be advantageous that areas in the same vertical or horizontal alignment as the selected area are scaled in accordance to the scaling of said selected area, wherein said scaling may be done only in one dimension, for instance, only the height or width of said neighboring areas may be adapted to the scaled height or width of said selected area.

According to the present invention, the method may further comprise vertical and/or horizontal scrolling. Scrolling may be understood as shifting the content that is currently visible in a display, i.e. the areas in said first and/or second representation, so that adjacent areas, which can not be presented with said content at one time within the display due to its limited dimensions, become visible. Scrolling may be possible seamlessly, or on a grid basis, for instance an area-to-area basis. Said scrolling may be controlled by a viewer via keys, a joystick, a stylus or a finger in combination with a touch-screen display, a mouse pointer or similar interaction techniques.

According to the present invention, the method may further comprise presenting said plurality of areas in said first representation, if said selected area is de-selected. It then can be switched between said second representation of a selected area and said first representation.

According to the present invention, content of selected areas shown in said second representation may be zoomed by a first zoom factor. Thus in addition to said presentation of said areas in said first and second second representation, a further option to increase or decrease the scale of content of areas may be offered.

According to the present invention, said zooming by said first zoom factor may be performed for content in all areas that are presented. Thus when zooming content of a selected area, also content in neighboring areas may be zoomed by the same zoom factor.

According to the present invention, content of areas shown in said first representation may be zoomed by a second zoom factor. The value and the range of this zoom factor may be the same as that of said first zoom factor, or be a different, for instance, value and/or range may be adapted to said first representation.

According to the present invention, if said at least one selected area shown in said second representation is shown with at least one area in said first representation at the same time, and if then at least one of said at least one areas shown in said first representation is selected, said newly selected at least one area may be shown in said second representation, and at least said formerly selected area may be shown in said first representation.

According to the present invention, after a selection of said at least one active area, a display may be positioned to show as much of the content of said at least one selected area as possible.

According to the present invention, a top edge of said at least one selected area may be positioned essentially at a top edge of a display, and/or in horizontal direction left edges or right edges or center points of said selected area and said display may be essentially scrolled to the same horizontal position.

According to the present invention, elements inside said at least one selected area shown in said second representation may be selectable. Said elements may for instance be links, hyperlinks, forms or similar elements that can be selected.

According to the present invention, said at least one page may obey the Hypertext Markup Language HTML format or a derivative thereof. Such a derivative may for instance be the extensible HTML (XHTML) format or any other markup language.

According to the present invention, said step of at least partially dividing said at least one page (or parts thereof) into a plurality of areas may comprise element-wise rendering elements contained in said at least one page to obtain a rendered object with a maximum height and a maximum width, checking if a size of said rendered object exceeds a threshold, and forming an area from said rendered object if said threshold is exceeded. Said elements may, for instance, be HTML elements of one or more HTML pages. Said elements may, for instance, be rendered by determining corresponding pixel values under the assumption that said elements are to be shown in their original layout, so that said rendered object is represented by said pixel values. Said size of said rendered object may, for instance, be the number of pixels contained in said rendered object. Said area may, for instance, be formed by setting said area equal to said rendered object.

According to the present invention, said step of at least partially dividing said at least one page into a plurality of areas may further comprise checking if edges of said formed area cut other elements, and forming a smaller area from said rendered object if other elements are cut. Said area may, for instance, be iteratively reduced until no element contained in it is cut any more.

According to the present invention, said step of at least partially dividing said at least one page into a plurality of areas may further comprise checking if at least one edge of said formed area is not straight, and forming a smaller area from said rendered object if at least one edge is not straight.

According to the present invention, said step of at least partially dividing said at least one page into a plurality of areas may further comprise checking if a formed area can be combined with a previously formed area, and combining said formed area and said previously formed area if they can be combined.

According to the present invention, areas may be combined if they have similar width, are horizontally similarly positioned and if their combined size does not exceed a threshold.

According to the present invention, said step of at least partially dividing said at least one page into a plurality of areas may further comprise checking if a formed area has to be re-sectioned, and re-sectioning said formed area if it has to be re-sectioned. Said re-sectioning may comprise forming a new area, which is smaller than the presently formed area.

According to the present invention, a formed area may have to be re-sectioned if its size exceeds a first threshold or if its size falls below a second threshold.

According to the present invention, said at least partial dividing of said at least one page into a plurality of areas may be based on table cells and/or paragraphs and/or frames defined by said markup language.

According to the present invention, in said at least partial dividing of said at least one page into a plurality of areas, a form element may be assigned as a whole to one area. A form element may for instance comprise a plurality of input fields, selection buttons and text that are aligned to each other, so that it may be advantageous not to further divide the form.

The invention claimed is:

1. A method comprising:
    at least partially dividing at least one page into a plurality of areas,
    presenting said plurality of areas in a first representation,
    making at least one area of said plurality of areas an active area, and
    in response to a user operation on said at least one active area, presenting at least one of said at least one active areas in a second representation,
    wherein said at least partially dividing at least one page into a plurality of areas comprises element-wise rendering elements contained in said at least one page to obtain a rendered object with a maximum height and a maximum width, checking if a size of said rendered object exceeds a threshold, and forming an area from said rendered object if said threshold is exceeded and further comprises checking if at least one edge of said formed area is not straight, and forming a smaller area from said rendered object if at least one edge is not straight.

2. A computer-readable medium having a computer program stored thereon, the computer program comprising:
    instructions operable to cause a processor to perform the method of claim 1.

3. The method according to claim 1, wherein said at least partially dividing at least one page into a plurality of areas comprises checking if a formed area can be combined with a previously formed area, and combining said formed area and said previously formed area if they can be combined.

4. The method according to claim 3, wherein areas are combined if they have a similar width, are horizontally similarly positioned and if their combined size does not exceed a threshold.

5. The method according to claim 1, wherein said at least partially dividing at least one page into a plurality of areas comprises checking if a formed area has to be re-sectioned, and re-sectioning said formed area if said formed area has to be re-sectioned, wherein said re-sectioning comprises forming a new area which is smaller than the presently formed area.

6. An apparatus comprising
    a processor configured to at least partially divide at least one page into a plurality of areas; and
    a display configured to present said plurality of areas in a first representation,
    the processor being further configured to make at least one area of said plurality of areas an active area; and
    the display being further configured to present at least one of said at least one active areas in a second representation in response to a user operation on said at least one of said active areas
    wherein the processor being configured to at least partially divide at least one page into a plurality of areas comprises the processor being configured to element-wise render elements contained in said at least one page to obtain a rendered object with a maximum height and a maximum width, being configured to check if a size of said rendered object exceeds a threshold, and being configured to form an area from said rendered object if said threshold is exceeded and further comprises the processor being configured to check if at least one edge of said formed area is not straight and being configured to form a smaller area from said rendered object is at least one edge is not straight.

7. The apparatus according to claim 6, which apparatus is a mobile phone.

8. The apparatus according to claim 6, wherein the processor being configured to at least partially divide at least one page into a plurality of areas comprises the processor being configured to check if a formed area can be combined with a previously formed area, and being configured to combine said formed area and said previously formed area if they can be combined.

9. The apparatus according to claim 8, wherein areas are combined if they have a similar width, are horizontally similarly positioned and if their combined size does not exceed a threshold.

10. The apparatus according to claim 6, wherein the processor being configured to at least partially divide at least one page into a plurality of areas comprises the processor being configured to check if a formed area has to be re-sectioned, and being configured to re-section said formed area if said formed area has to be re-sectioned, wherein the processor being configured to re-section comprises the processor being configured to form a new area which is smaller than the presently formed area.

11. A method comprising:
at least partially dividing at least one page into a plurality of areas,
outputting said plurality of areas for presenting said plurality of areas in a first representation, for making at least one area of said plurality of areas an active area, and for presenting at least one of said at least one active areas in a second representation in response to a user operation on said at least one active area,
wherein said at least partially dividing at least one page into a plurality of areas comprises element-wise rendering elements contained in said at least one page to obtain a rendered object with a maximum height and a maximum width, checking if a size of said rendered object exceeds a threshold, forming an area from said rendered object if said threshold is exceeded and further comprises checking if at least one edge of said formed area is not straight, and forming a smaller area from said rendered object if at least one edge is not straight.

12. The method according to claim 11, wherein said at least partially dividing at least one page into a plurality of areas comprises checking if a formed area can be combined with a previously formed area, and combining said formed area and said previously formed area if they can be combined.

13. The method according to claim 12, wherein areas are combined if they have a similar width, are horizontally similarly positioned and if their combined size does not exceed a threshold.

14. The method according to claim 11, wherein said at least partially dividing at least one page into a plurality of areas comprises checking if a formed area has to be re-sectioned, and re-sectioning said formed area if said formed area has to be re-sectioned, wherein said re-sectioning comprises forming a new area which is smaller than the presently formed area.

15. A computer-readable medium having a computer program stored thereon, the computer program comprising:
instructions operable to cause a processor to perform the method of claim 11.

16. An apparatus comprising
a processor configured to at least partially divide at least one page into a plurality of areas; and
an interface configured to output said plurality of areas for presenting said plurality of areas in a first representation, for making at least one area of said plurality of areas an active area, and for presenting at least one of said at least one active areas in a second representation in response to a user operation on said at least one active area,
wherein the processor being configured to at least partially divide at least one page into a plurality of areas comprises the processor being configured to element-wise render elements contained in said at least one page to obtain a rendered object with a maximum height and a maximum width, being configured to check if a size of said rendered object exceeds a threshold, and being configured to form an area from said rendered object if said threshold is exceeded and further comprises the processor being configured to check if at least one edge of said formed area is not straight and being configured to form a smaller area from said rendered object is at least one edge is not straight.

17. The apparatus according to claim 16, which apparatus is a content optimization server.

18. The apparatus according to claim 16, wherein the processor being configured to at least partially divide at least one page into a plurality of areas comprises the processor being configured to check if a formed area can be combined with a previously formed area, and being configured to combine said formed area and said previously formed area if they can be combined.

19. The apparatus according to claim 18, wherein areas are combined if they have a similar width, are horizontally similarly positioned and if their combined size does not exceed a threshold.

20. The apparatus according to claim 16, wherein the processor being configured to at least partially divide at least one page into a plurality of areas comprises the processor being configured to check if a formed area has to be re-sectioned, and being configured to re-section said formed area if said formed area has to be re-sectioned, wherein the processor being configured to re-section comprises the processor being configured to form a new area which is smaller than the presently formed area.

* * * * *